June 4, 1957 R. A. McNAUGHTON 2,794,950
TAPPER FOR ELECTRON TUBES
Filed Sept. 26, 1955 3 Sheets-Sheet 1

INVENTOR
ROY ARTHUR MC NAUGHTON

BY Michael Hertz.
ATTORNEY

INVENTOR
ROY ARTHUR MC NAUGHTON

BY *Michael Hertz,*
ATTORNEY

INVENTOR
ROY ARTHUR MC NAUGHTON

BY *Michael Hertz,*

ATTORNEY

# United States Patent Office 2,794,950
Patented June 4, 1957

2,794,950
TAPPER FOR ELECTRON TUBES

Roy A. McNaughton, Emporium, Pa., assignor to Sylvania Electric Products Inc., a corporation of Massachusetts Application September 26, 1955, Serial No. 536,363

12 Claims. (Cl. 324—20)

The present invention relates to impact-testing apparatus and in particular to a mechanical actuated impacting device which may be utilized in testing electron tubes and other articles.

In the ensuing description, impact-testing of an electron tube is described for illustrative purposes, for it will be obvious that the impacting device can be utilized in connection with any article desirably tested for appropriate characteristics by means of shock energy excitation.

In testing electron tubes for noise, microphonics, resonance, poor or faulty connections, internal short circuits, and certain forms of vibrations, it is customary to connect the tube undergoing test to an external indicating unit. The indicating unit is arranged to supply operational potentials to the tube components being tested and to provide metered, visual or audible or any combination of such indications of defects. When thus connected, the electron tube is usually subjected to a series of mechanical shocks or impacts to place the internal components of the electron tube in relative motion, thereby causing any defects therein, such as poor welds, microphonics, intermittent short circuits, and the like to manifest themselves as visual or audible indicia in the related indicating unit.

For purposes of ascertaining the conformity of the electron tubes to electrical and mechanical specifications, it is imperative that each tube of a given type be impact-tested under identical conditions. Accordingly, the series of mechanical shocks or impacts imparted to each tube being tested must be uniform in force, in spacing between adjacent impacts, in duration of individual impacts, in number, and in direction. Further, in order that the testing apparatus be adaptable for testing a variety of types and sizes of tubes and that for a given tube type the effects of constructional variation and the operational errors involved in holding the tube in the testing socket be minimized, it is essential that the magnitude of the force impacted upon the tube be readily adjustable and the momentum of the impacting means be constant through its traverse. Thus the blows, imparted to the wall of the tube must be substantially constant in force, within constructional limits of the impacting device, regardless of the diameter and position of the tube being tested. In the known manually, electrically, and mechanically actuated impacting devices utilized heretofore for shock-testing, electron tubes and other articles, the foregoing essential characteristics of the impacts delivered, which are essential to accurate testing, were not adequately provided. Thus, in the case of tubes, unreliable test data, improperly rejected tubes, and improperly passed tubes frequently occured, as a result of uncontrolled variation in the impacts delivered by the known impacting devices. Furthermore, owing to the difficulty in judging the striking force of manual devices or in adjusting the impacting means of prior electrical or mechanical devices, tubes employing fragile envelopes or delicate internal structures were frequently destroyed.

Broadly, impact-testing devices embodying and demonstrating features of the present invention are of the mechanically controlled and regulated type, and are of the same general class as those disclosed in my Patent #2,738,459 granted March 13, 1956. As pointed out therein, mechanically controlled operation of the impacting device eliminates many of the difficulties encountered when using electrically actuated apparatus, such as variations in impacting force with changes in energizing potentials, and spurious noise in the associated electrical indicating apparatus.

It is therefore an object of the present invention to provide a novel impacting device broadly adaptable to shock-energy excitation or impact-testing of electron tubes and other articles. Another object is the provision of an impacting device which is relatively free from variations in gravitational and frictional effects. Still another object is the provision in an impacting device of means for accurately adjusting and controlling the impacting force thereof over a wide range of operating conditions. Further objects include the provision, of means for imparting a substantially constant momentum to the impacting member of said device, of means for accurately spacing individual impacts delivered by said device, and of means for defining a series of such impacts. Additional objects are the provision, in a device including a pair of impacting members, of means for equalizing the blows delivered by each member, and for timing the impacts delivered by the impacting members relative to one another.

Other objects and advantages of the present invention will become apparent from the following detailed description of the impacting apparatus adapted in one illustrative embodiment thereof for tube testing, and taken in conjunction with the accompanying drawings, wherein.

In accordance with the instant invention, one or more impacting members is mounted for movement along a path relatively free of gravitational and frictional effects, as by being horizontally disposed and supported on antifraction means. A mechanically actuated motion-imparting mechanism is arranged in operative relationship to the impacting member for periodically placing the impacting member in motion with a predetermined momentum along its prescribed path. When thus placed in motion, the impacting member travels with uniform speed for a distance along said path as a result of the initial velocity imparted thereto, to a position of impacting relationship with the tube undergoing test.

Figure 1:
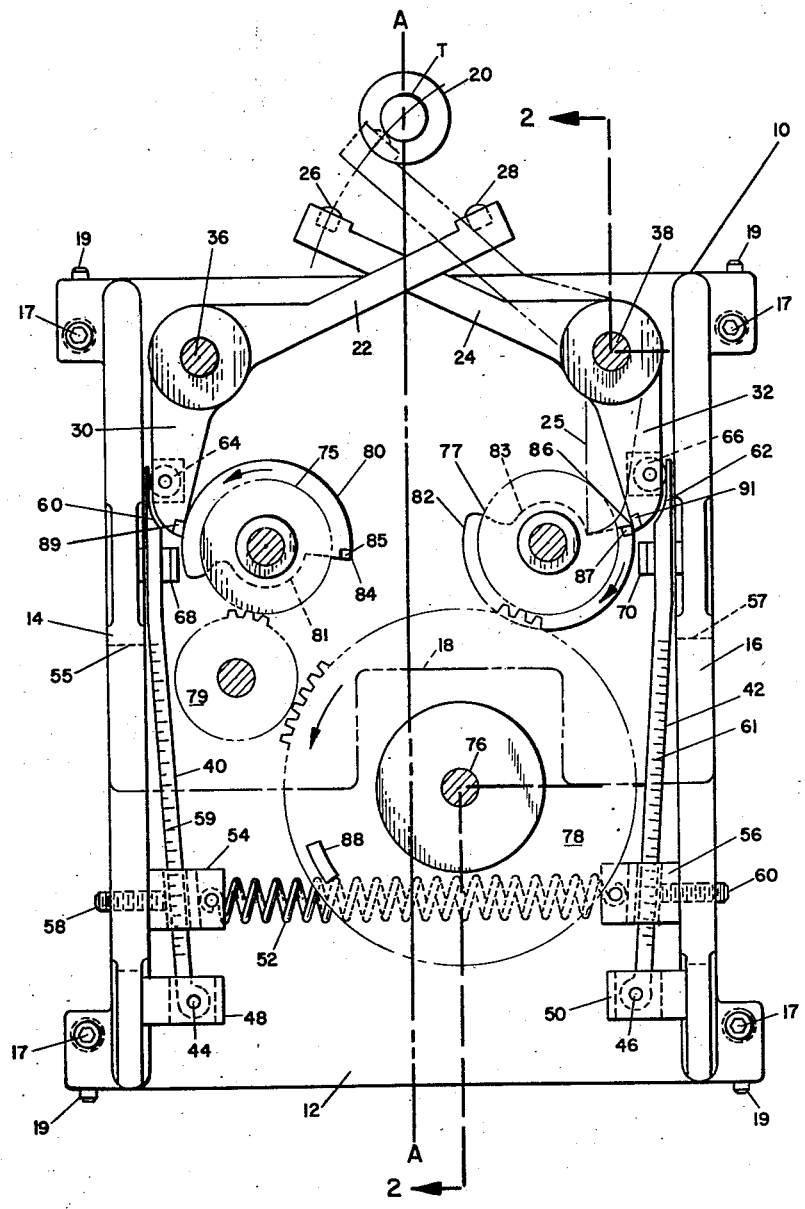
Fig. 1 is a top plan view with the motor, cover and other parts broken away, removed and shown in section, of an impact-testing device embodying features of the present invention.
Figure 2:
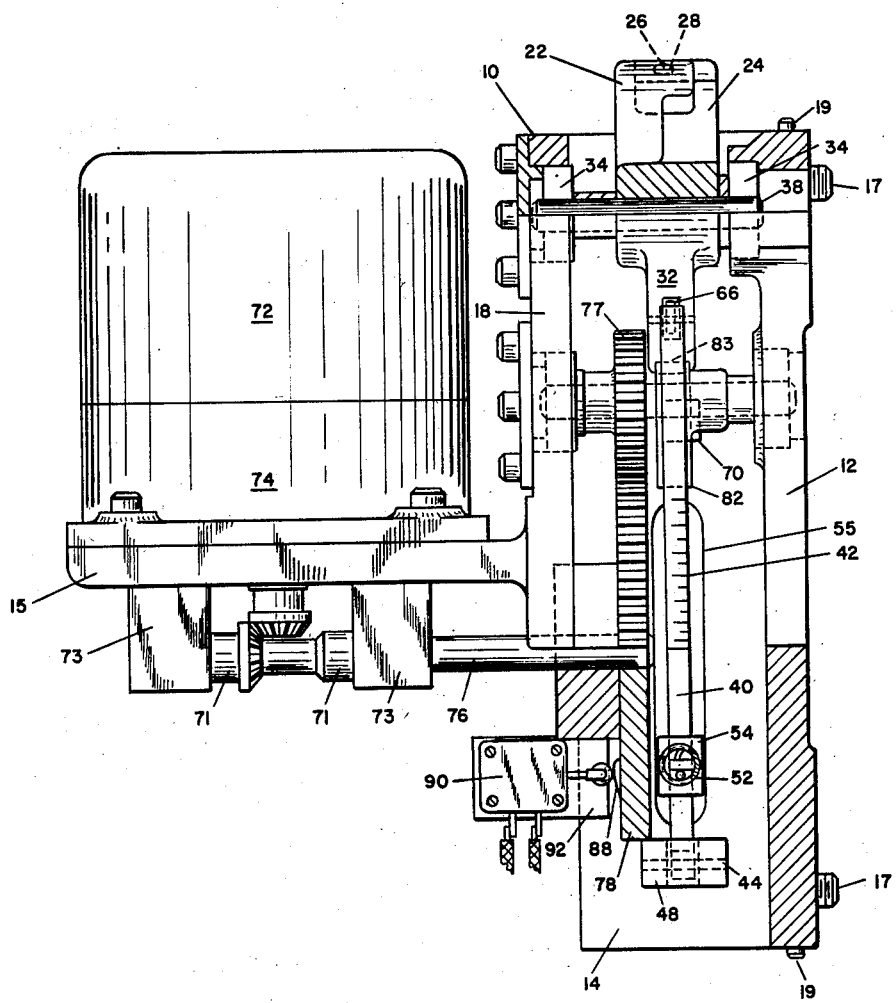
Fig. 2 is an elevational view, with parts omitted and broken away for the purpose of clarity, taken substantially along the broken line 2—2 of Fig. 1.

Referring now specifically to the drawings and particularly to Figs. 1 and 2, there is shown one illustrative form of the mechanical shocking or impacting device particularly adapted for impact testing an electron tube or the like at a given repetition rate and with an impact intensity readily controllable over a relatively wide range and accurately settable within given metered limits. The testing apparatus includes a housing 10 having a base or bottom wall 12, upstanding side walls 14 and 16, and a top wall 18, portions of the top wall being shown in broken lines in Fig. 1 for purposes of clarity. Disposed along the longitudinal axis of symmetry of the housing 10, designated generally by the leters A—A (Fig. 1), is a socket or similar receptacle 20 for supporting a tube T to be tested, with its major axis preferably more or less perpendicular to the axis of symmetry A—A. The socket 20 is connected to an external indicating unit which applies operating potentials to the tube, through the use of well-known testing circuitry.

Mounted within the housing 10 adjacent the tube socket 20, are a pair of impacting members or tappers 22 and 24 having individual tapper heads or anvils 26 and 28 and operating extensions or arms 30 and 32. The tappers 22 and 24 are each mounted for angular movement along a horizontal path, which is substantially free of variations in gravitational effect.

The paths are selected so that the tapper heads 26 and 28 have lines of action extending through points above the tube socket 20 in order to bring the respective tappers into impacting relationship to the tube T. The tappers 22 and 24 are matched for weight equality and distribution and are individually supported on the pivot shafts 36 and 38 and an anti-friction means, such as the greaseless ball bearings generally designated at 34 in Fig. 2. By balancedly mounting the respective impacting members or tappers 22 and 24 and through provision of anti-friction devices 34, the impacting members, when placed in motion along their respective horizontal paths of action, will move substantially free of gravitational and frictional variations. Accordingly, when an initial angular velocity is imparted to the respective tappers 22 and 24, the tappers will travel at substantially constant velocity for a relatively long arcuate traverse. Suitable leveling devices, for an example the stud bolts 17 and the locking means 19, may be provided on the support or housing 10 to assure travel of the respective impacting members 22 and 24 in a horizontal plane. The impacting members 22 and 24 are shown in crossed-over relationship in order that counterclockwise movement of the member 22 will bring its anvil or head 28 into contact with the tube T, while clockwise movement of the member 24 will bring its head or anvil 26 into contact with the tube T. The heads 26 and 28 may be of any appropriate metal, the use of steel giving a steep wave front to the shock delivered to the tube T and thus providing high frequency components in the shock wave. This is frequently to advantage, especially where high frequency shock-excitation is desired to detect structural resonance in the tube being tested.

Mechanical motion-imparting means are arranged in operative relation to the impacting members 22 and 24 for periodically placing the impacting members in motion along their respective paths or lines of action with a predetermined initial momentum. When placed in motion from the starting or rest postion, shown by the full lines of Fig. 1, the impacting members 22 and 24 move with substantially constant momentum to an impacting position relative to the tube T, illustrated by the broken lines of Fig. 1. The mechanical motion-imparting or driving means is arranged so that after an initial driving force is imparted to the impacting members 22 and 24 during a relatively short driving interval, the respective members travel by means of their own inertia and with substantially constant momentum toward the tube under test. This arrangement substantially eliminates the need for exactly locating the tube T with respect to the start or rest position of the respective impacting members or tappers 22 and 24. It has been found with such a motion-imparting mechanism that the blows delivered to the tube under test will be substantially constant for any position or size of the tube, within constructional limits of the device, in relation to the impacting members after the initial driving force or momentum is imparted to the members.

One form of motion-imparting mechanism for the respective impact members 22 and 24 includes a pair of driving arms or levers 40 and 42 which are arranged in divergent relationship with respect to each other along opposite side walls 14 and 16 of the housing 10. The driving levers 40 and 42 may extend horizontally of the housing 10 and are mounted adjacent the ends remote from the impacting members 22 and 24 for pivotal movement on respective vertical axles 44 and 46 which are carried by the supports 48 and 50 extending inwardly of the side walls 14 and 16, and which may be slidably and adjustably mounted thereon to compensate for minor imbalance in blows resulting from manufacturing tolerances of the various moving parts of the impacting device. The driving arms or levers 40 and 42 are matched for weight equality and distribution and are inter-connected by a common driving spring 52, which is transversely connected to the driving levers 40 and 42 by means of the brackets 54 and 56 slidably supported on and longitudinally adjustable along the levers 40 and 42. The spring-supporting brackets 54 and 56, likewise matched for weight equality and distribution, are provided with set screws 58 and 60 so that the brackets 54 and 56 may be secured at selected locations along the levers 40 and 42. The aforementioned set screws may protrude respectively through slots 55 and 57, formed in walls 14 and 16 of the housing 10, as better shown in Fig. 3. Lateral alignment of the brackets 54 and 56 with each other together with the relative driving force imparted by the driving levers 40 and 42 may be indicated by reference to the scales 59 and 61, visible through the aforementioned slots 55 and 57 and through the cut-away top 11 of the housing 10. Upon displacement of the brackets 54 and 56 in tandem away from the respective pivots 44 and 46 along the divergent levers 40 and 42, the tension on the spring 52 is progressively increased and the static inertia of the driving levers 40 and 42 and of the impacting members 22 and 24 is more easily overcome. Abutting or driving surfaces 60 and 62 are provided adjacent the ends of the levers 40 and 42 and remote from the pivots 44 and 46, which surfaces 60 and 62 are shaped complementary to adjacent surfaces of the operating extensions 30 and 32 of the pivoted impact members 22 and 24, respectively. At the points of bearing contact between the driving levers 40 and 42 and the associated operating extensions 30 and 32, anti-friction devices may be provided, such as rollers 64 and 66.

The throw or inward travel of the respective operating levers 40 and 42 is accurately limited by provision of stops or brackets 68 and 70. Each of the limiting bracket is of L-shaped configuration and includes an upstanding stop spaced inwardly of and parallel to the adjacent side wall. After a predetermined inward swing of the levers 40 and 42 about their respective pivots 44 and 46 further motion of the levers is precluded by contact with the steps 68 and 70. In this relatively short lever stroke or throw, there is driving contact between the levers and the adjacent or associated impacting arms 22 and 24. Therefore, the impacts delivered to the tube T by each arm are substantially constant in magnitude regardless of the size or position of the tube, inasmuch as after removal of the driving force, the angular velocity of each impacting arm will be substantially constant throughout the traverse thereof.

Alternatively, impacting members corresponding to 22 and 24 may be made in rod-like form and mounted for rectilinear movement in individual tubular supports (not shown) therefor. The throw of levers 40 and 42 bearing against the end of the rod-like members will then be limited by contact with the end of the tubular support after the impacting members have been set in motion. The rod-like members may be returned to their initial positions relative to the supports and subsequently released, by means of the quick-release mechanisms described hereinafter, cooperating with projections provided for that purpose on each rod-like member and protruding through suitable slots in the tubular supports.

Appropriate quick-release mechanisms are provided for the impacting members 22 and 24, which mechanisms normally maintain the respective operating extensions 30 and 32 in contact with the associated driving levers 40 and 42, when the driving levers 40 and 42 are in their outermost positions wherein the spring 52 is placed in tension. The quick-release mechanisms, detailed below, are arranged to alternately free the impact members 22 and 24 for travel along their respective horizontal paths.

Specifically, the release mechanisms are driven by a motor 72 coupled through a reduction gear unit 74 to a main drive shaft 76 which extends upwardly of the housing 10 in spaced and parallel relation to the pivot shafts 36 and 38 of the impacting arms 22 and 24. The drive shaft is appropriately supported by the collars 71 and the bearings 73. The latter are attached to the gear unit 74 which is in turn supported by the bracket 15. At the lower end of the main drive shaft 76 and within the housing 10 is a horizontally disposed main driving gear 78, coupled to quick-release cams 80 and 82 through appropriate gearing, for an example, gears 75, 79, and 77, respectively. The cams 80 and 82 are arranged symmetrically of the longitudinal axis A—A (Fig. 1) and are driven in opposite directions by the illustrated gearing train. The cams 80 and 82 have rise developments appropriately disposed to effect release of the impacting members 22 and 24 in alternation. The rise developments of the cams are selected to normally maintain the driving levers 40 and 42 in their outermost position (illustrated in Fig. 1) wherein the spring 52 is under tension. The dwell developments 81 and 83 of the cams is such that unimpeded motion of the impact members or tappers 22 and 24 is achieved, while the release points 84 and 86 are well defined in order to assure instantaneous effectiveness of the driving spring 52. The relative position of the impacting member 24 after release is shown by the broken lines denoted generally at 25. At the drop-off or release points 84 and 86 of the cams 80 and 82, appropriate anti-friction bearing surfaces 85 and 87 are employed, such as carboloy or similar hard metal inserts. Likewise, the corresponding bearing portions of the extensions 30 and 32 are provided with anti-friction inserts 89 and 91 to further contribute to accurate release and durability of the mechanisms. It will be obvious that a single cam (not shown), driven by the gear 78 and having an appropriate development may be utilized in place of cams 80 and 82. The configuration of at least one of the operating extensions 30 or 32 of the impacting member 22 or 24 will be changed accordingly, in order to effect the proper release thereof.

By appropriate selection of the cam development or of the gearing inter-connections between the drive gear 78 and the respective cams 80 and 82, the tube T may be impacted in alternation at equally spaced intervals and for a given number of times through a tapping cycle, which in the embodiment herein illustrated corresponds arbitrarily to one complete revolution of the driving gear 78. In this embodiment, the driving gear 78 carries a cam tripping mechanism 88 which is associated with a micro-switch 90 or the like, suitably mounted by means of bracket 92 on the housing 10, in order that at the end of one complete revolution of the gear 78, the power to the motor 72 may be interrupted. Switch 90 may desirably be connected to the motor-circuit relay 94 mounted on bracket 96. The details of the electrical circuitry for this type of operation are well understood, and accordingly a more detailed description is dispensed with.

Figure 3:
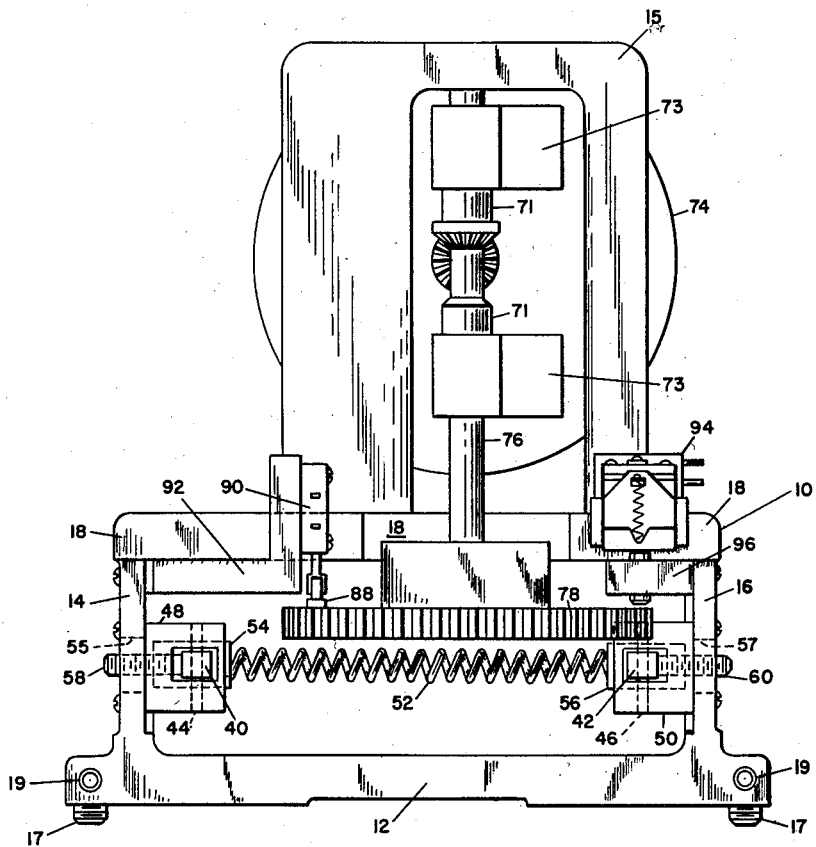
Fig. 3 is a rear elevation of Fig. 1.

With particular reference to Fig. 3, the spatial relationship existing among the components of one exemplary form of the invention, is illustrated more fully. Adjacent the rearward extremities of the walls 14 and 16 are attached respectively the supports 48 and 50, wherein the driving levers 40 and 42 are pivotally retained. Forwardly of the supports 48 and 50 and slidably mounted on the driving levers are the longitudinally adjustable brackets 54 and 56, which are interconnected by means of the driving spring 52. The adjustable brackets are adapted to be secured in any desired position longitudinally of the aforesaid driving levers, by manipulation of the set screws 58 and 60 protruding through the longitudinally arranged slots 55 and 57 in the housing 10. The micro-switch 90, affixed to bracket 92, is mounted upwardly of the associated tripping cam 88 disposed near the periphery of the driving gear 78.

In operation, power is imparted to the drive shaft 76 by activation of the motor 72 whereupon the main driving gear 78 is rotated in a given direction, causing the release cams 80 and 82 to be rotated contrariwise to each other as indicated by the arrows. With the cams 80 and 82 having their respective rise portions opposite and in contact with the extensions 30 and 32 of the impact members 22 and 24, the impacting member 22 is urged in a clockwise direction to move driving lever 40 to its outermost or limit position, and the impact member 24 is urged in a counterclockwise direction to move driving lever 42 to its outermost or limit position, thereby placing the spring 52 in a predetermined tension. It is to be noted that the amount of pressure exerted on the arms 30 and 32 by the motion-imparting mechanism, as well as the final tension of spring 52, may be varied by adjusting the spring-supporting brackets 54 and 56 as described heretobefore, or by using a different type of spring. As is apparent from Fig. 1, further rotation of the quick-release cam 82 in the clockwise direction will cause the sharp drop-off point 86 to pass the abutting extremity of the operating extension or follower 32 to release the impacting member 24 for clockwise rotation. Upon release of the impact member 24, the tension on spring 52 causes a counterclockwise displacement of driving lever 42 about its pivot 46 through the arcuate driving throw or thrust, as determined by the configuration of the limiting bracket 70. This inward motion of the driving lever 42 induces an initial angular velocity in the impacting member or tapper 24 in a clockwise direction. The impacting member 24 swings at substantially constant speed until the anvil or head 26 contacts the tube T, or reaches the end of its forward travel, which may be limited by an appropriate stop (not shown). Although the cams 80 and 82 are positioned so that the impacters 22 and 24 are released alternately at equally spaced intervals throughout the impacting cycle, it is to be appreciated that releases may be made simultaneously or in any other timed relationship by varying the relative angular positions of the cams 80 and 82 or their developments. Similarly, release of the impacting arm 22 in a counterclockwise direction is effected by rotation of the quick-release cam 80 during the tapping cycle. At the end of one revolution of the driving gear 78, corresponding to one testing or tapping cycle, the tripping mechanism 88 contacts the micro-switch 90, cutting off the power to the motor 72. A further tapping cycle may be started through appropriate electrical controls, not shown.

The illustrated construction with its matched and symmetrically arranged components contributes to obtaining a uniformity of impacts which in the case of electron tubes is not critically dependent upon the tube position or diameter. The use of anti-friction devices at the various bearing points assures durability of the mechanical components, and further contributes to a high degree of uniformity and reliability in operation. The balanced driving system, including the levers 40 and 42 and the single spring 52, imparts substantially uniform momenta to the impacting members 22 and 24 since utilization of the single spring is effective for both of the members. Accordingly, it is not necessary to obtain accurately matched and paired springs.

From the foregoing, it will be seen that the impacting or shock-exciting device according to the present invention is highly reliable and easily controlled, and provides a series of impacts of predetermined number and reproducible strength at well-defined intervals so that accurate testing of a variety of electron tube types within closely metered limits is feasible. The aforementioned advantages are achieved by a mechanical system which requires little maintenance. Although the impacting device has been described with reference to electron tube testing apparatus, the device is obviously applicable to any article requiring such impact- or shock-testing. Therefore, numerous modifications of the embodiment of the present invention will occur to those skilled in the art, and accordingly the appended claims should be given a latitude of interpretation consistent with the disclosure and it should be appreciated that certain features of the invention can be used without a corresponding use of other features.

What is claimed as new is:

1. An impacting device for use in impact-testing an article, said device comprising an impacting member; a support for mounting said member for impacting movement along a predetermined path; propelling means operative to urge said impacting member along said path; means for initially restraining said member in its original position in said path, for subsequently releasing said member for impacting movement along said path, and for finally returning said member to its initial position; and means in the path of movement of the propelling means for rendering said propelling means ineffective after said impacting member has been set in motion and prior to completion of said impacting movement.

2. An impacting device for use in impact-testing an article, said device comprising at least one impacting member; a support for mounting said member for impacting movement along a predetermined path; mechanical propelling means operative to urge said impacting member along said path; means for repeatedly restraining said member in its original position in said path, releasing said impacting member for impacting movement along said path, and returning said impacting member to said original position; and means in the path of movement of the propelling means for rendering said propelling means ineffective after said impacting member initially has been set in motion and prior to the completion of said impacting movement.

3. An impact-testing apparatus for testing an article such as an electronic tube, said apparatus comprising at least one impacting member; a support for mounting said member, said mounting permitting impacting movement of said member along a predetermined path; means for mounting said tube in said path; electrical circuitry connected to said tube and adapted to indicate the effects of impact-testing said tube; means operative to propel said member to strike said tube; an operable cam having rise and dwell portions alternately contacting said member and adapted to initially restrain said member, to subsequently release said member for impacting movement along said path, and to finally return said member to its initial position in said path; means for rotating said cam; and means for rendering said propelling means ineffective after said impacting member initially has been set in motion along said path and prior to striking said tube.

4. An impacting device for use in impact-testing an article, said device comprising an impacting member; a support for said member, said support determining the path of impacting movement of said member; mechanical propelling means operative to urge said impacting member along said path; means for varying the strength of said propelling means; means for restraining said member in its initial position in said path, for subsequently releasing said member for impacting movement along said path, and for finally returning said member to said initial position; and means in the path of movement of the propelling means for rendering said propelling means ineffective after said member initially has been set in motion, and prior to completion of said impacting movement.

5. An impacting device for subjecting an article to shock excitation for testing purposes, said device comprising an impacting member; a support for said member, said support adapted to permit impacting movement of said member along a prescribed path; a pivoted driving lever periodically in contact with said member; a driving spring connected to said driving lever and operative to cause said driving lever to set said impacting member in motion; an operable cam having rise and dwell portions alternately contacting said impacting member and adapted to initially restrain said member from movement, to subsequently release said member for impacting movement along said path, and to finally return said member to its initial position in said path; means for rotating said cam; and means for discontinuing driving contact of said driving lever with said impacting member after said member initially has been set in motion and prior to completion of said impacting movement.

6. An impacting device for subjecting an article to shock excitation for testing purposes, said device comprising an impacting member; a support for said member, said support adapted to permit impacting movement of said member along a prescribed path; propelling means for said member, said propelling means including a driving lever intermittently in contact with said member, a driving spring, and means for attaching said spring to said lever at any of a plurality of positions along said lever; an operable cam having rise and dwell portions alternately contacting said impacting member and adapted repeatedly to restrain said member from movement, to release said member, and to return said member to its initial position in said path; means for rotating said cam; and means for discontinuing driving contact of said driving lever with said impacting member after said member initially has been set in motion and prior to completion of said impacting movement.

7. An impacting device for subjecting an article to shock excitation for testing purposes, said device comprising a pair of impacting members; individual supports for said members, each support adapted to permit impacting movement of said member associated therewith along a prescribed path; a pair of pivoted driving levers periodically in driving contact with said members, respectively; means operative to cause said driving levers to set said impacting members in motion; an operable cam having portions adapted to initially restrain said members from movement, to subsequently release said members, and to finally return said members to their initial positions in said paths; driving mechanism for rotating said cam; and a pair of stops for discontinuing said driving contact, respectively, of said driving levers.

8. An impacting device for subjecting an article to shock excitation for testing purposes, said device comprising a pair of impacting members; individual supports for said members, said supports determining the paths of impacting movement of said members; a pair of pivoted driving levers periodically in driving contact with said members, respectively; means operative to cause said driving levers to set said impacting members in motion; means forming a part of said supports for terminating the driving contact of said driving levers, with the said members, respectively, after the members have been set in motion and prior to completion of their respective impacting movements; individual cam followers on said members; a pair of cams associated respectively with said followers, said cams and said followers respectively adapted to initially restrain said members from movement, to subsequently release said impacting members, and to finally return them to their initial positions in their respective paths; and driving mechanism for rotating said cams.

9. An impacting device for subjecting an article to shock excitation for testing purposes, said device comprising a pair of impacting members; individual supports for mounting said members for impacting movement throughout respective predetermined paths; a pair of pivoted driving levers individually in driving contact with said members at their initial positions in said path; individual spring-supporting brackets slidably mounted on said levers and adjustable longitudinally thereof; a driving spring interconnecting said brackets and operative to cause said levers to set said members in motion; a pair of stops associated with said levers for terminating said driving contact after said members have been set in motion and prior to completion of said impacting movement; and means for initially restraining said members from movement, releasing said members, and returning them to said initial positions.

10. An impacting device for subjecting an article to at least one impacting cycle for testing purposes, said device comprising a pair of impacting members; individual supports for mounting said members for travel in predetermined paths of impacting movement; a pair of pivoted driving levers individually in driving contact with said members at their initial positions in said path; individual spring-supporting brackets slidably mounted on said levers and adjustable longitudinally thereof; a driving spring interconnecting said brackets and operative to cause said levers to set said members in motion; a pair of stops associated with said levers for terminating said driving contact after said members have been set in motion and prior to completion of said impacting movement; a pair of operable cams individually associated with said impacting members and adapted for repeatedly restraining said member from movement, releasing said members, and returning them to said initial positions; driving mechanism for rotating said cams, said mechanism including a driving gear; and means associated with said driving gear for stopping said mechanism after a predetermined number of impacts have been delivered during each impacting cycle.

11. An impact-testing apparatus for uniformly testing an article such as an electronic tube, said apparatus comprising a pair of impacting members arranged symmetrically of a reference axis; means for mounting said members for impacting movement toward a point on said axis; means for mounting said tube at said point; electrical circuitry connected to said tube and adapted to indicate the effects of impact-testing said tube; a pair of driving levers pivoted for movement toward each other and individually in driving contact with said members in their initial positions relative to said axis, said driving levers being arranged symmetrically of said axis; a driving spring interconnected to said levers and operative to cause said levers to set said members in motion; means for terminating said driving contact after said members have been set in motion and prior to striking said tube; and means for initially restraining said members from movement, releasing said members, and returning them to said initial positions.

12. An impact-testing apparatus for uniformly testing an article such as an electronic tube, said apparatus comprising a pair of identical impacting members arranged symmetrically of a reference axis; identical supports for mounting said members for impacting movement in respective horizontal paths toward a point on said axis; means for mounting said tube at said point; electrical circuitry connected to said tube and adapted to indicate the effects of impact-testing said tube; a pair of identical driving levers pivoted for movement toward each other and arranged symmetrically of said axis, said levers being individually in driving contact with said members at their initial positions in said paths; individual and identical spring-supporting brackets slidably mounted on said levers and adjustable longitudinally thereof; a driving spring interconnecting said brackets and operative to cause said levers individually to set said members in motion; means for terminating said driving contact after said members individually have been set in motion and prior to striking said tube; and means for initially restraining said members form movement, subsequently releasing said members, and finally returning them to said initial positions.

References Cited in the file of this patent
UNITED STATES PATENTS

| | | |
|---|---|---|
| 2,422,317 | Stock et al. | June 17, 1947 |
| 2,721,971 | Francois | Oct. 25, 1955 |